US012237599B2

(12) United States Patent
Ito

(10) Patent No.: US 12,237,599 B2
(45) Date of Patent: Feb. 25, 2025

(54) SOCKET

(71) Applicants: YAMAICHI ELECTRONICS CO., LTD., Tokyo (JP); Huawei Technologies Co., Ltd., Guangdong (CN)

(72) Inventor: Toshiyasu Ito, Tokyo (JP)

(73) Assignees: YAMAICHI ELECTRONICS CO., LTD., Tokyo (JP); Huawei Technologies Co., Ltd., Guangdong (CN)

(*) Notice: Subject to any disclaimer, the term of this patent is extended or adjusted under 35 U.S.C. 154(b) by 346 days.

(21) Appl. No.: 17/814,705

(22) Filed: Jul. 25, 2022

(65) Prior Publication Data

US 2023/0029598 A1 Feb. 2, 2023

(30) Foreign Application Priority Data

Jul. 27, 2021 (CN) ........................ 202110852075.2

(51) Int. Cl.
*H01R 12/70* (2011.01)
*H01R 13/11* (2006.01)

(52) U.S. Cl.
CPC ........... *H01R 12/707* (2013.01); *H01R 13/11* (2013.01)

(58) Field of Classification Search
CPC ............ H01R 13/6585; H01R 13/6588; H01R 12/707; H01R 13/11; H01R 23/688; H01R 23/6873
USPC .................................................. 439/517, 108
See application file for complete search history.

(56) References Cited

U.S. PATENT DOCUMENTS

| | | | | |
|---|---|---|---|---|
| 8,702,452 B2 * | 4/2014 | Tai | H01R 13/6461 439/108 |
| 9,780,492 B1 * | 10/2017 | Wang | H01R 24/60 |
| 10,177,518 B2 * | 1/2019 | Chen | H01R 13/6471 |
| 2009/0221165 A1 | 9/2009 | Buck et al. | |
| 2014/0004753 A1 * | 1/2014 | Tai | H01R 13/6474 439/676 |
| 2014/0273652 A1 * | 9/2014 | Szu | H01R 13/6585 439/660 |
| 2015/0031241 A1 * | 1/2015 | Yang | H01R 13/6585 439/607.08 |
| 2019/0089097 A1 * | 3/2019 | Cho | H01R 13/6471 |

FOREIGN PATENT DOCUMENTS

| | | |
|---|---|---|
| CN | 207069200 U | 3/2018 |
| CN | 212209927 U | 12/2020 |
| JP | 2012174616 A | 9/2012 |
| TW | 201501425 A | 1/2015 |

* cited by examiner

*Primary Examiner* — Gary F Paumen
(74) *Attorney, Agent, or Firm* — Hayes Soloway PC

(57) ABSTRACT

A socket includes a housing and a plurality of contacts. The housing is formed in a box-shape with an opening and is provided with a matrix of through holes at a bottom portion. The plurality of contacts includes ground contacts and signal contacts which are arranged so as to be aligned alternately in a predetermined array direction by one or a plurality of them and are passed through the through holes. The ground contacts adjacent to each other in the array direction are short-circuited.

10 Claims, 13 Drawing Sheets

| | 1 | 2 | 3 | 4 | 5 | 6 | 7 | 8 |
|---|---|---|---|---|---|---|---|---|
| 1 | G | G | G | G | G | G | G | G |
| 2 | G | N | G | N | G | N | G | N |
| 3 | G | P | G | P | G | P | G | P |
| 4 | G | G | G | G | G | G | G | G |
| 5 | N | G | N | G | N | G | N | G |
| 6 | P | G | P | G | P | G | P | G |
| 7 | G | G | G | G | G | G | G | G |
| 8 | G | N | G | N | G | N | G | N |
| 9 | G | P | G | P | G | P | G | P |
| 10 | G | G | G | G | G | G | G | G |
| 11 | N | G | N | G | N | G | N | G |
| 12 | P | G | P | G | P | G | P | G |
| 13 | G | G | G | G | G | G | G | G |
| 14 | G | N | G | N | G | N | G | N |
| 15 | G | P | G | P | G | P | G | P |
| 16 | G | G | G | G | G | G | G | G |

FIG. 3

SOCKET

CROSS-REFERENCE TO RELATED APPLICATION

This application claims the benefit of Chinese Patent application No. 202110852075.2 filed on Jul. 27, 2021, the contents of which are hereby incorporated by reference in its entirety.

TECHNICAL FIELD

The present invention relates to a socket for high-speed transmission mounted on a circuit board.

BACKGROUND

Some LGA (Land grid array) packages are mounted on circuit boards via specialized sockets rather than directly mounted on the circuit boards themselves. As an example of documents disclosing a technique related to this type of socket of LGA package, Japanese Patent Application Publication No. 2012-174616 (hereinafter referred to as "Patent Document 1") can be taken up. In the socket for electronic component disclosed in Patent Document 1, a metal board with a plurality of through holes is used as the bottom of the housing, contacts for signal and contacts for ground arranged in a lattice shape are inserted into the through holes of the metal board, and the contacts are fixed to the housing.

However, in the socket of Patent Document 1, the contact for signal and the contact for ground have the same shape. Therefore, there is a problem that the resonance frequencies of the multiple reflections due to the mismatching of the impedances of the contacts coincide between the contact for signal and the contact for ground, and the crosstalk (signal radiation to surroundings due to resonance) becomes larger.

The present disclosure has been made in view of such a problem, and one of the objects is to provide a socket which can prevent the occurrence of crosstalk.

SUMMARY

In accordance with a first aspect of the present disclosure, there is provided a socket including a housing and a plurality of contacts. The housing is formed in a box-shape with an opening and is provided with a matrix of through holes at a bottom portion. The plurality of contacts includes ground contacts and signal contacts which are arranged so as to be aligned alternately in a predetermined array direction by one or a plurality of them and are passed through the through holes. The ground contacts adjacent to each other in the array direction are short-circuited.

Further features of the present invention will become apparent from the following description of exemplary embodiments with reference to the attached drawings.

BRIEF DESCRIPTION OF THE DRAWINGS

FIG. 3 is a diagram showing the arrangement of contacts of FIG. 2;

DETAILED DESCRIPTION OF THE DRAWINGS

Figure 1:
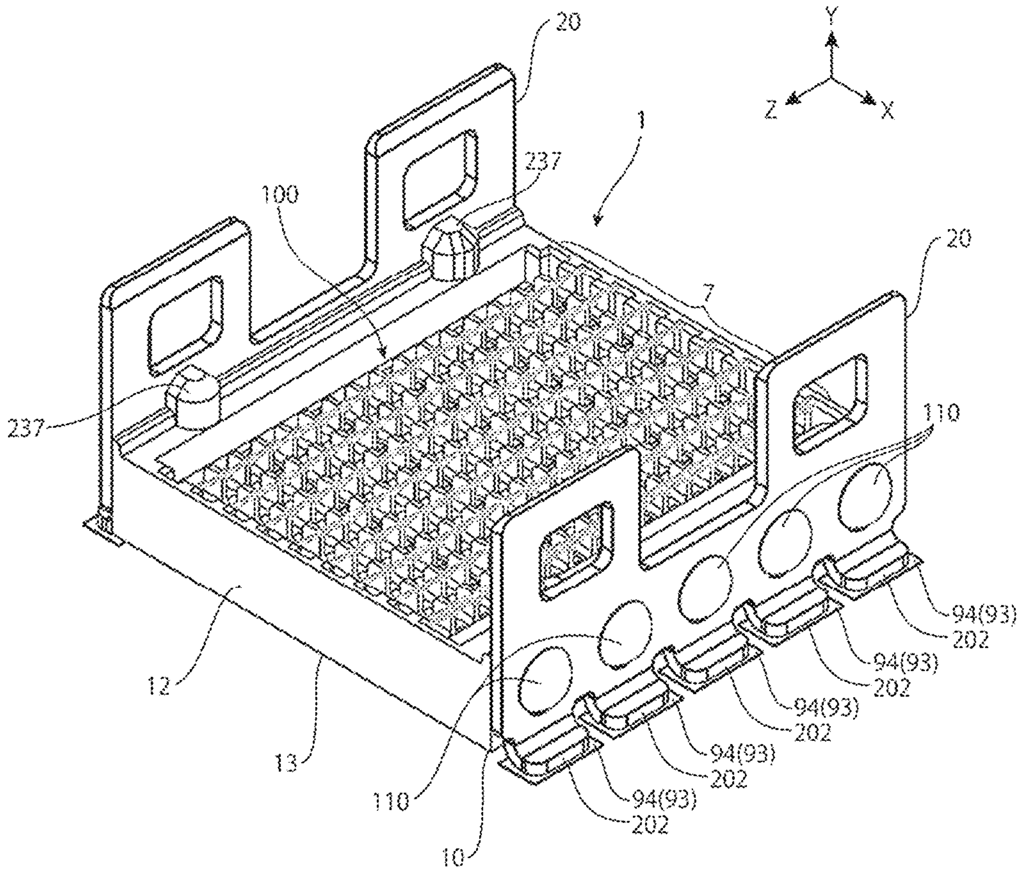
FIG. 1 is a perspective view of a socket according to a first embodiment of the present disclosure.
Figure 2:
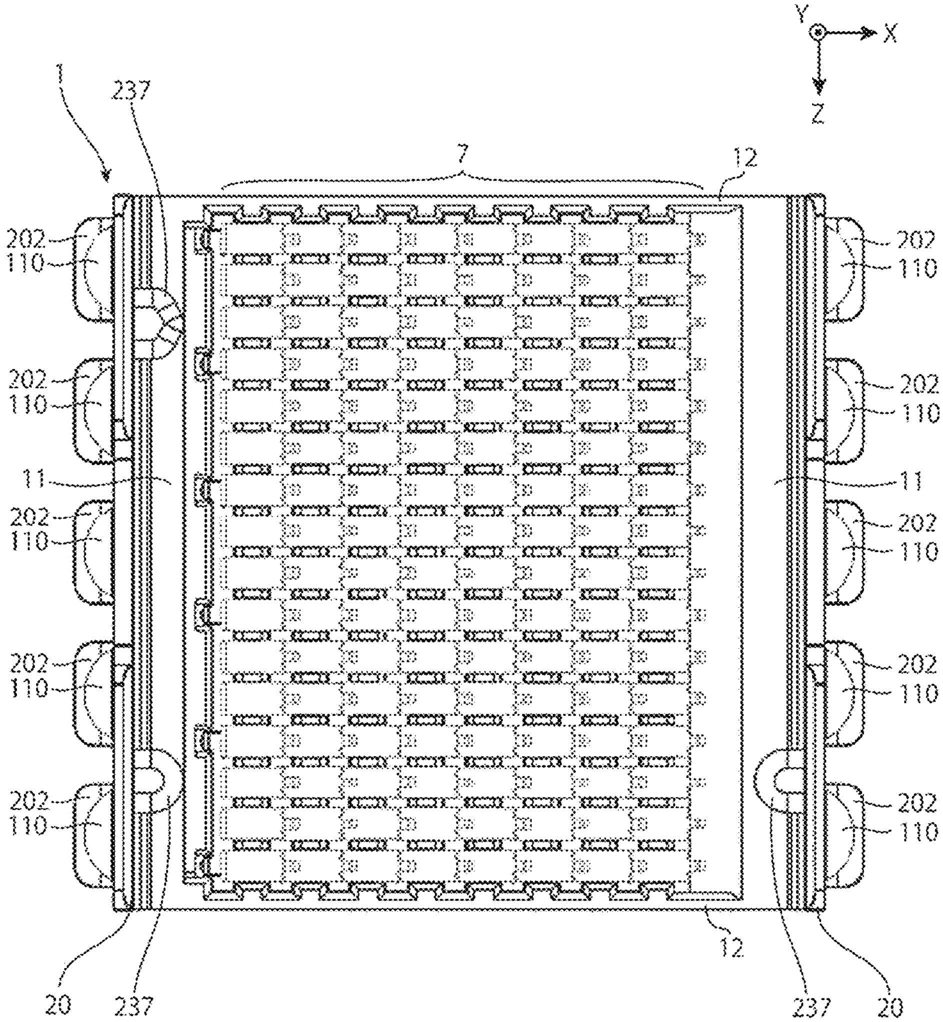
FIG. 2 is a diagram of the socket of FIG. 1 as viewed from the +Y side.

Hereinafter, a socket 1 according to the first embodiment of the present disclosure will be explained with reference to drawings. The socket 1 is mounted on a circuit board 93, and is used by fitting the IC package 91 to the opening 100 on the opposite side of the mounting surface. The IC package 91 is an optical transceiver. The IC package 91 performs a high-speed differential transmission by PAM (Pulse Amplitude Modulation) 4.

In the following description, the fitting direction of the IC package 91 to the socket 1 is appropriately referred to as the Y direction, one direction orthogonal to the Y direction is appropriately referred to as the X direction, and the direction orthogonal to both the Y direction and the X direction is appropriately referred to as the Z direction. Further, the open side of the opening 100 of the socket 1 in the Y direction is referred to as the upper side, and the reverse side is referred to as the lower side. In addition, the −X side may be referred to as the front side, the +X side may be referred to as the rear side, the −Z side may be referred to as the left side, and the +Z side may be referred to as the right side.

The socket 1 has a housing 10, a holder 20 and contacts 7. The housing 10 is formed in a box shape with an opening 100. The housing 10 has a bottom portion 13 forming the bottom of the opening 100, and two pairs of side wall portions 11 and 12 each facing each other in the X direction and the Z direction, respectively, across the opening 100.

The bottom portion 13 is provided with a matrix of 16 rows and 8 columns of through holes 17.

The side surface of each of the two side wall portions 11 facing each other in the X direction is provided with five ribs 110. The cross section of the rib 110 is formed in a perfect circular shape. The five ribs 110 of the side wall portions 11 on the ±X sides are passed through five support holes of the holders 20 on the ±X sides and are fused in the five support holes.

The portions directly below the five support holes at the lower ends of the holders 20 extend downward as protruding portions 202. The protruding portion 202 of the holder 20 on the +X side is bent to the +X side, which is the outer side, on the lower side of the lower end of the housing 10. The protruding portion 202 of the holder 20 on the −X side is bent to the −X side, which is the outer side, on the lower side of the lower end of the housing 10. The lower surfaces of these bent portions form mounting surfaces to be soldered to pads 94 of the circuit board 93.

Two positioning pins 237 are provided at the side wall portion 11 of the housing 10 on the −X side, and one positioning pin 237 is provided at the side wall portion 11 on the +X side. The positioning pins 237 are fitted into the positioning grooves of the IC package 91.

The contact 7 includes: a contact point portion 71 in contact with the pad 92 of the IC package 91, which is a communication partner; a spring portion 72 extending obliquely downward from the end portion of the contact point portion 71; an insertion portion 73 bent in a dogleg-shape and extending downward from the end portion of the spring portion 72 and inserted into the through hole 17; and a soldered portion 74 bent forward at a right angle at the lower end of the insertion portion 73 and soldered to the circuit board 93.

The contact point portion 71 is bent into a key-shape. A round hole 79 is provided on the upper side of the insertion portion 73. The lower portions of both side surfaces of the insertion portion 73 expand outward as press-in portions 75. The soldered portion 74 is formed in a dish-shape. The solder ball 90 is fixed to the lower surface of the soldered portion 74.

The contacts 7 are aligned sixteen by sixteen in a predetermined array direction (hereinafter, referred to simply as the array direction) parallel to the side wall portion 11. The contacts 7 are passed through the through holes 17 of the housing 10. The press-in portion 75 of the contact 7 is engaged with the inner periphery wall of the through hole 17. The spring portion 72 and the contact point portion 71 of the contact 7 are located in the opening 100 on the upper side of the bottom portion 13 of the housing 10, and the soldered portion 74 and the solder ball 90 of the contact 7 are located on the lower side of the bottom portion 13.

Here, the contacts 7 include signal contacts for +signals of high-speed differential transmission, signal contacts for −signals of high-speed differential transmission, and ground contacts for ground. In the following description, appropriately, letter (P) is attached to the contacts 7 for +signals of high-speed differential transmission, letter (N) is attached to the contacts 7 for −signals of high-speed differential transmission, and letter (G) is attached to the contacts 7 for ground, so as to distinguish them.

Of the contacts 7, a pair of two adjacent contacts 7(P) and 7(N) form one channel of high-speed differential transmission, and respective pairs of the contacts 7(P) and 7(N) are arranged apart in the Z direction and the X direction orthogonal to the Z direction. The contacts 7(G) are arranged apart at adjacent positions in the Z direction and adjacent positions in the X direction in each pair of the contacts 7(P) and 7(N).

More specifically, as shown in FIG. 3, in the first column, the third column, the fifth column and the seventh column, the first row to the fourth row are the contacts 7(G), the fifth row is the contact 7(N), the sixth row is the contact 7(P), the seventh row to the tenth row are the contacts 7(G), the eleventh row is the contact 7(N), the twelfth row is the contact 7(P), and the thirteenth row to the sixteenth row are the contact 7(G).

In the second column, the fourth column, the sixth column and the eighth column, the first row is the contact 7(G), the second row is the contact 7(N), the third row is the contact 7(P), the fourth row to the seventh row are the contacts 7(G), the eighth row is the contact 7(N), the ninth row is the contact 7(P), the tenth row to the thirteenth row are the contacts 7(G), the fourteenth row is the contact 7(N), the fifteenth row is the contact 7(P), and the sixteenth row is the contact 7(G).

Figure 4:
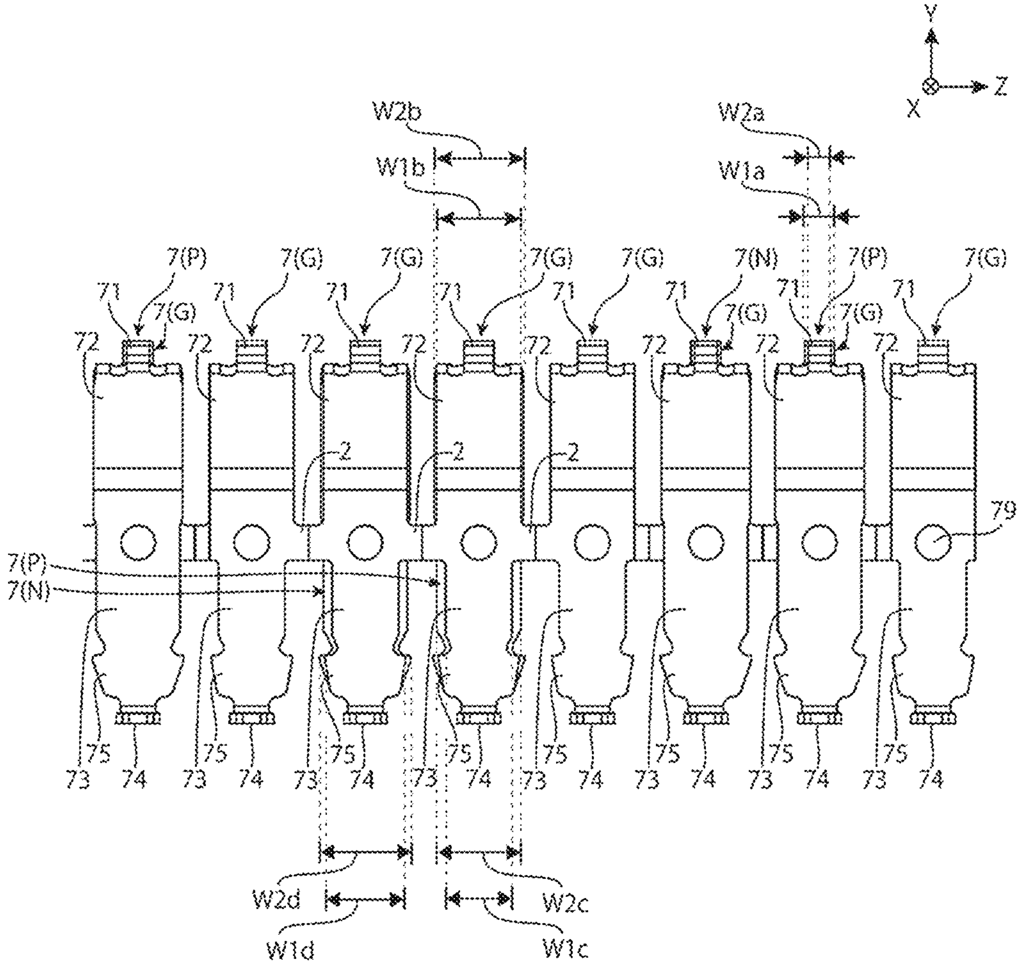
FIG. 4 is a diagram showing the contacts of the first column and the second column as viewed from the −X side.
Figure 5:
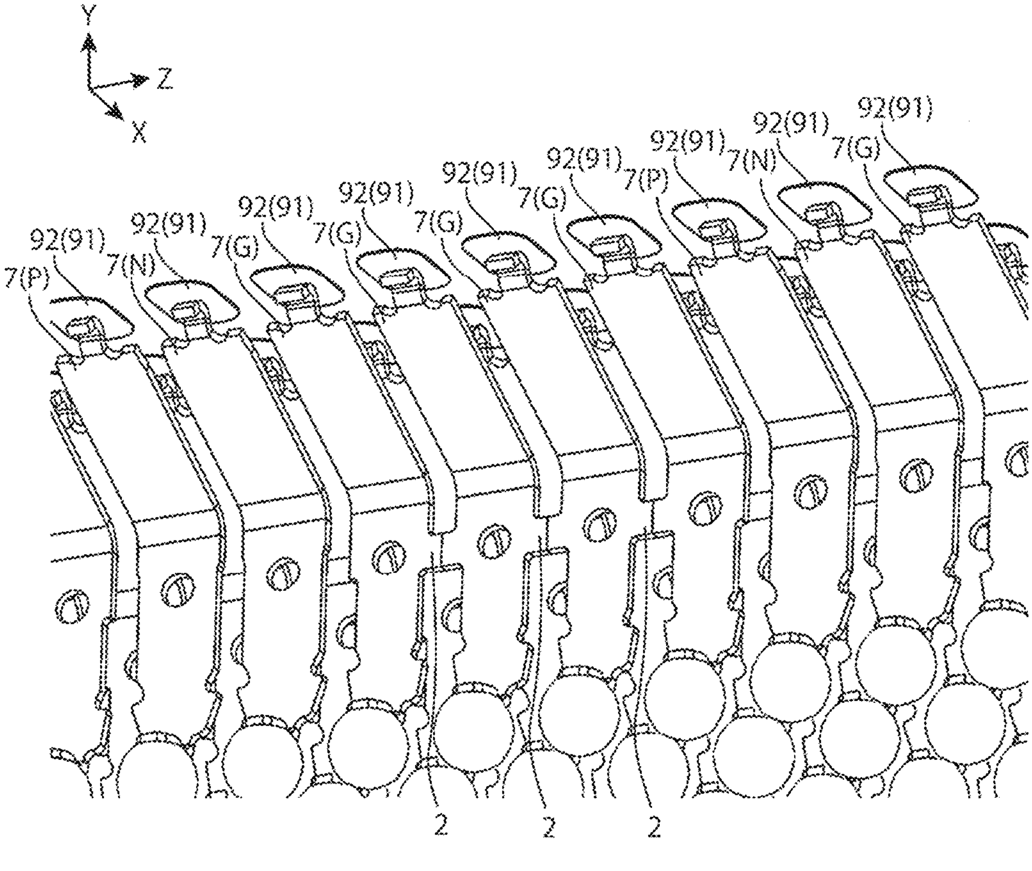
FIG. 5 is a perspective view of the contacts of the socket of FIG. 1 and FIG. 2, connecting portions, and pads of IC packages.
Figure 6:
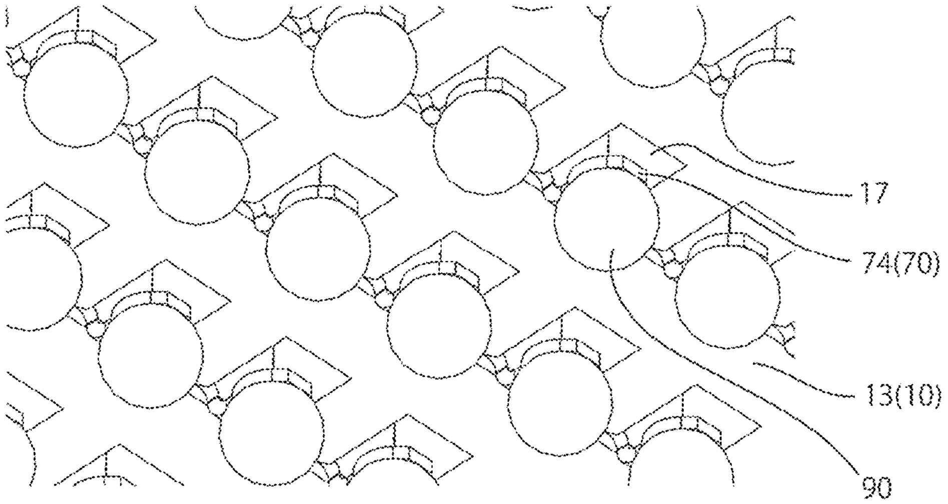
FIG. 6 is a perspective view of the bottom portion of the socket of FIG. 1 and FIG. 2 as viewed from the lower side.

FIG. 4 is a diagram in which the contacts 7 of the first column and the second column are viewed from the −X side. FIG. 5 is a perspective view of the contacts 7 of the socket 1, the connecting portions 2, and the pads 92 of the IC packages 91. As shown in FIG. 4 and FIG. 5, four contacts 7(G) arranged parallel to the side wall portion 11 are short-circuited by the connecting portion 2. The connecting portion 2 connects the insertion portions 73 of the left and right contacts 7(G). The connecting portion 2 is connected flush with the left and right contacts 7(G). As shown FIG. 4, the width W1*a* in the array direction of the contact point portion 71 of the contact 7(G) is wider than the width W2*a* in the array direction of the contact point portions 71 of the contacts 7(P) and 7(N). The width W1*b* in the array direction of the spring portion 72 of the contact 7(G) is narrower than the width W2*b* in the array direction of the spring portions 72 of the contacts 7(P) and 7(N). The width W1*c* in the array direction of the insertion portion 73 of the contact 7(G) is narrower than the width W2*c* in the array direction of the insertion portions 73 of the contacts 7(P) and 7(N). Further, as shown in FIG. 4, the width W1*d* in the array direction of the press-in portion 75 of the contact 7(G) is narrower than the width W2*d* in the array direction of the press-in portions 75 of the contacts 7(P) and 7(N).

The four contacts 7(G) aligned in the array direction are integrated by the connecting portion 2. The positions of the four contacts 7(G) in the odd-numbered column and the positions of the four contacts 7(G) in the even-numbered column are offset by three contacts in the array direction. Therefore, in the place where the contacts 7(P) and 7(N) are located in front of the contact 7(G), the contact point portion 71 of the contact 7(G) appears to protrude from the contact point portions 71 of the contacts 7(P) and 7(N) when viewed from the front side. In the place where the contact 7(G) is located in front of the contacts 7(P) and 7(N), the spring portions 72, the insertion portions 73 and the press-in portions 75 of the contacts 7(P) and 7(N) appear to protrude from the spring portion 72, the insertion portion 73 and the press-in portion 75 of the contact 7(G) when viewed from the front side.

The details of the present embodiment are described above. The socket 1 of the present embodiment includes: a housing 10 formed in a box-shape with an opening 100 and provided with a matrix of through holes 17 at the bottom portion 13; a plurality of contacts 7 including ground contacts 7(G) and signal contacts 7(P) and 7(N) which are arranged so as to be aligned alternately in the array direction (Z direction) by a plurality of them and are passed through the through holes 17, wherein the contacts 7(G) adjacent to each other in the array direction are short-circuited. Thus, it is possible to provide a socket 1 capable of preventing the occurrence of crosstalk.

Figure 7:
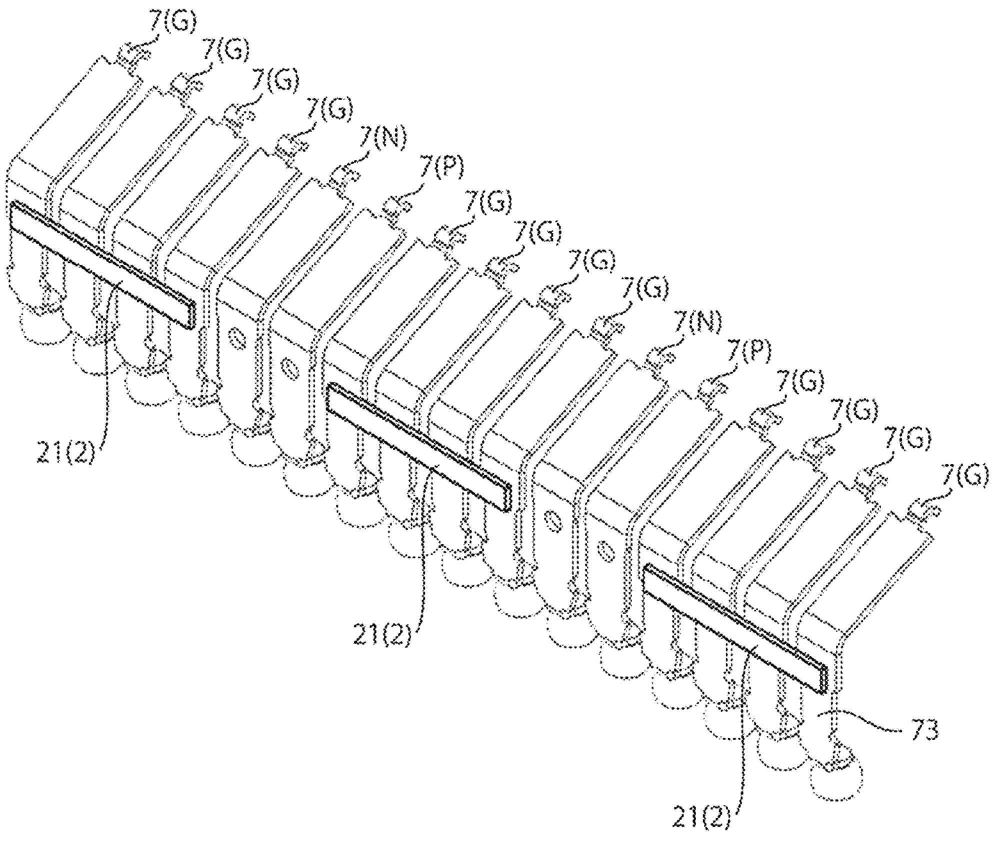
FIG. 7 is a perspective view of contacts and bars of a socket according to a second embodiment of the present disclosure.

As shown in FIG. 7, in the socket 1 of the present embodiment, the connecting portion 2 is formed by a bar 21 made of metal. The bar 21 extends in a straight line in the array direction. The bar 21 has a length of four contacts. In the socket 1 of the present embodiment, the bar 21 is fixed to the front surfaces of the insertion portions 73 of four adjacent contacts 7(G). The four contacts 7(G) are connected via the bar 21. The same effect as that of the above first embodiment is also obtained according to the present embodiment.

Figure 8:
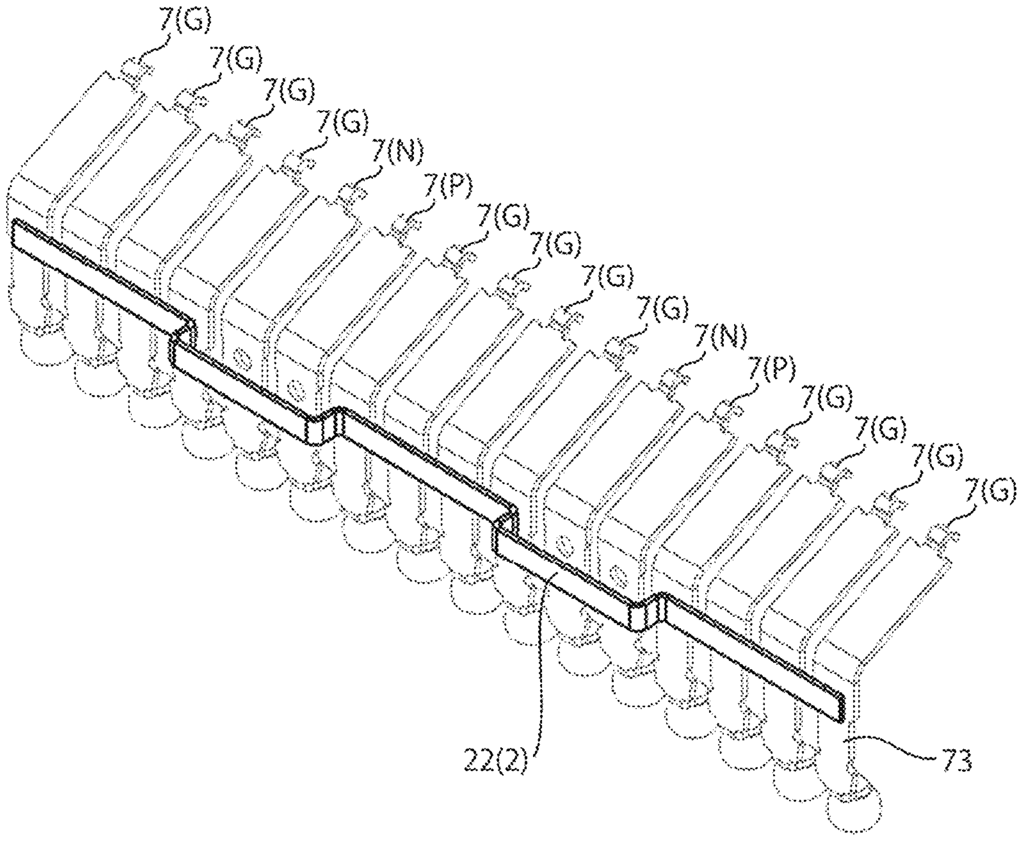
FIG. 8 is a perspective view of contacts and a bar of a socket according to a third embodiment of the present disclosure.

As shown in FIG. 8, in the socket 1 of the present embodiment, the connecting portion 2 is formed by a bar 22 made of metal. The bar 22 has a length of sixteen contacts 16. In the socket 1 of the present embodiment, the bar 22 is in contact with the front surface of the contact 7(G), and is bent in an approximate U-shape so as to avoid the contacts 7(P) and 7(N). The contacts 7(G) are connected via the bar 22. The same effect as that of the above first embodiment is also obtained according to the present embodiment.

Figure 9:
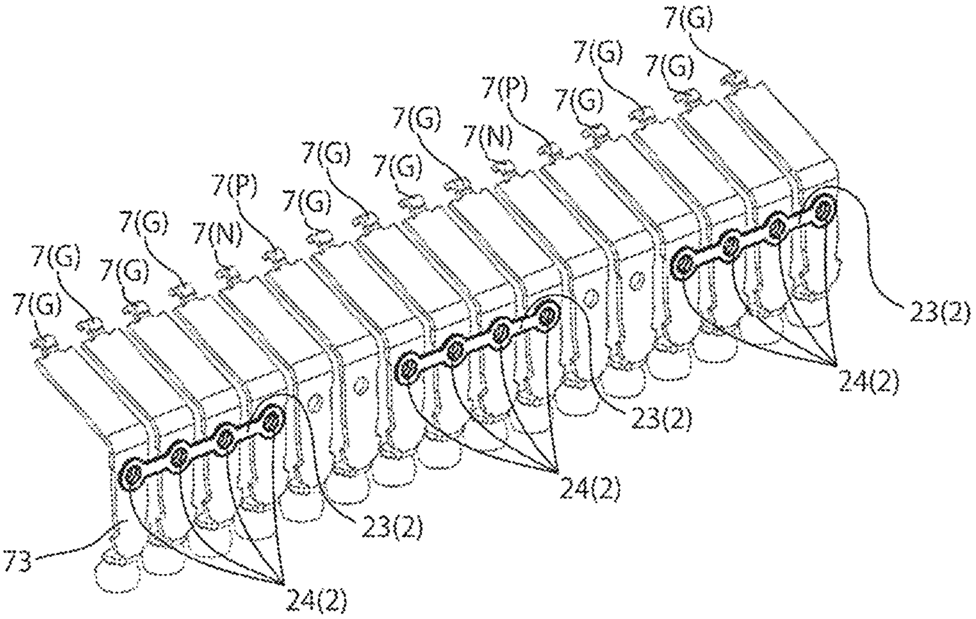
FIG. 9 is a perspective view of contacts, bars, and protrusion portions of a socket according to a fourth embodiment of the present disclosure.

As shown in FIG. 9, in the socket 1 of the present embodiment, the connecting portion 2 is formed by a bar 23 made of metal and four protrusion portions 24 protruding from one surface of the bar 23. The protrusion portions 24 are formed of metal. The bar 23 is connected to four adjacent contacts 7(G) by fitting the four protrusion portions 24 of the bar 23 into the round holes 79 of the contacts 7. The four contacts 7(G) are connected via the bar 23. The same effect as that of the above first embodiment is also obtained according to the present embodiment.

Figure 10:
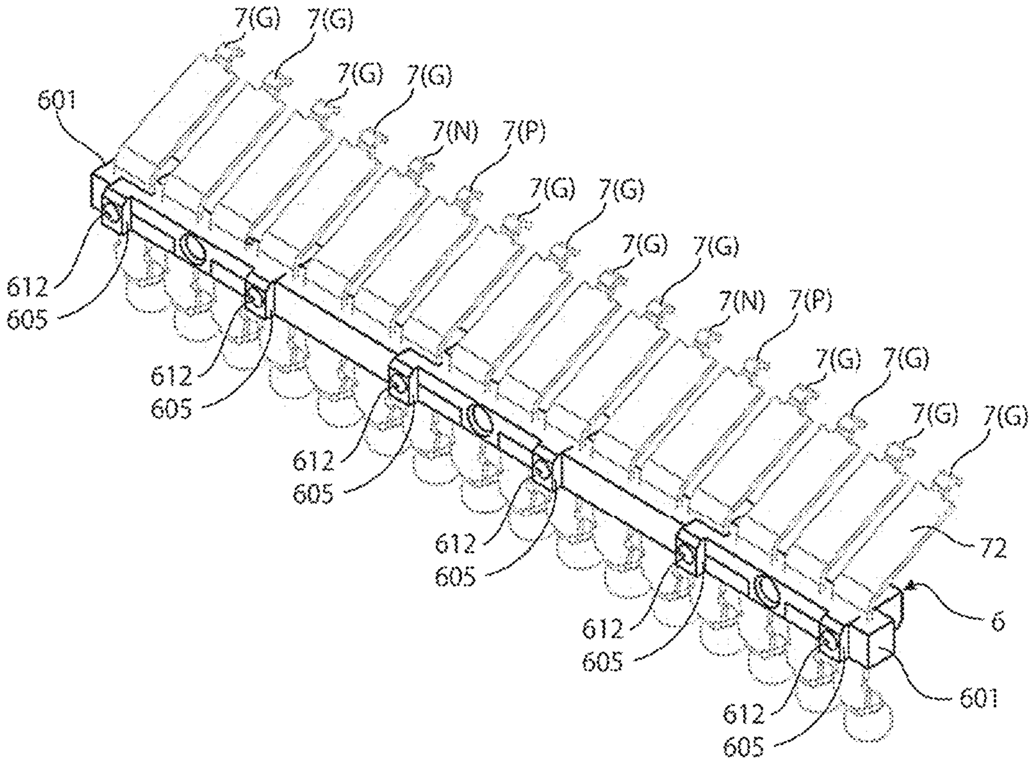
FIG. 10 is a diagram showing contacts and an insulating member of a socket according to a fifth embodiment of the present disclosure.
Figure 11:
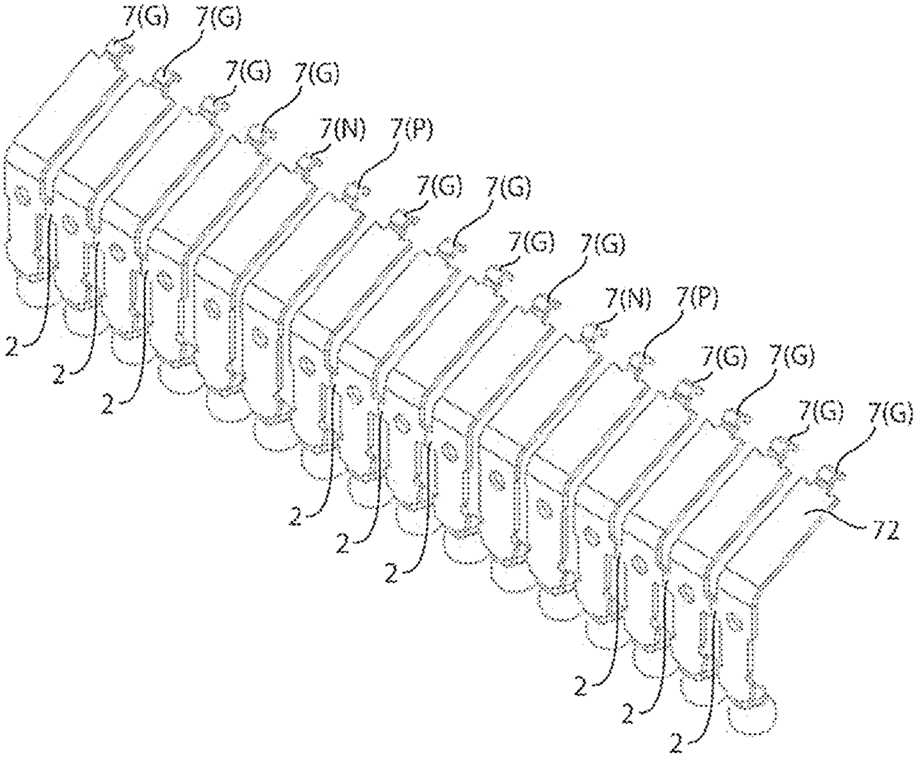
FIG. 11 is a diagram in which the insulating member is removed from the socket of FIG. 10.

As shown in FIG. 10 and FIG. 11, in the socket 1 of the present embodiment, sixteen contacts 7 aligned in the array direction are inserted into one insulating member 6, and the connecting portions 2 between the contacts 7(G) are covered by the insulating member 6. The insulating member 6 extends in one direction. The front portions of two contacts 7(G) at both ends of the four contacts 7(G) on the front surface of the insulating member 6 protrude outward at convex portions 605, and the front surfaces of the convex portions 605 are provided with bowl-shaped protrusion portions 612.

The integration of the contacts 7 and the insulating member 6 is mounted on the housing 10 by fitting the side end portions 601 of the insulating member 6 into the grooves of the left and right wall portions 12 of the housing 10. The protrusion portions 612 of each insulating member 6 are abutted to the rear surface of the insulating member 6 on the front side thereof. Eight insulating members 6 are bridged between the wall portions 12 of the housing 10, respectively, and the protrusion portions 612 of the insulating member 6 on the rear side are abutted to the rear surface of the insulating member 6 on the front side, so that the eight insulating members 6 can be firmly fixed in the opening 100.

Although the first to the fifth embodiments of the present disclosure have been described above, the following modifications may be added to the embodiments.

(1) In the first to the fifth embodiments described above, the through holes 17 and the contacts 7 of the socket 1 are formed in sixteen rows and eight columns. However, the rows of the through holes 17 and the contacts 7 may be more than sixteen rows or less than sixteen rows. Further, the columns of the through holes 17 and the contacts 7 may be more than eight columns or less than eight columns.

(2) In the sockets 1 of the second to the fourth embodiments described above, as in the fifth embodiment, sixteen contacts 7 may be inserted into one insulating member 6. In this case, the contacts 7, the metal bars 21, 22, 23, and the insulating members 6 may be integrated, and the insulating member 6 may be inserted between the wall portions 12 of the housing 10. Further, in the integration of the contacts 7, the metal bars 21, 22, 23, and the insulating members 6, four contacts 7(G) and a pair of contacts 7(P) and 7(N) may be aligned alternatively, and the metal bars 21, 22, 23 may be attached to the four contacts 7(G), and in that state, the contacts 7 may be inserted into one insulating member 6.

Figure 12:
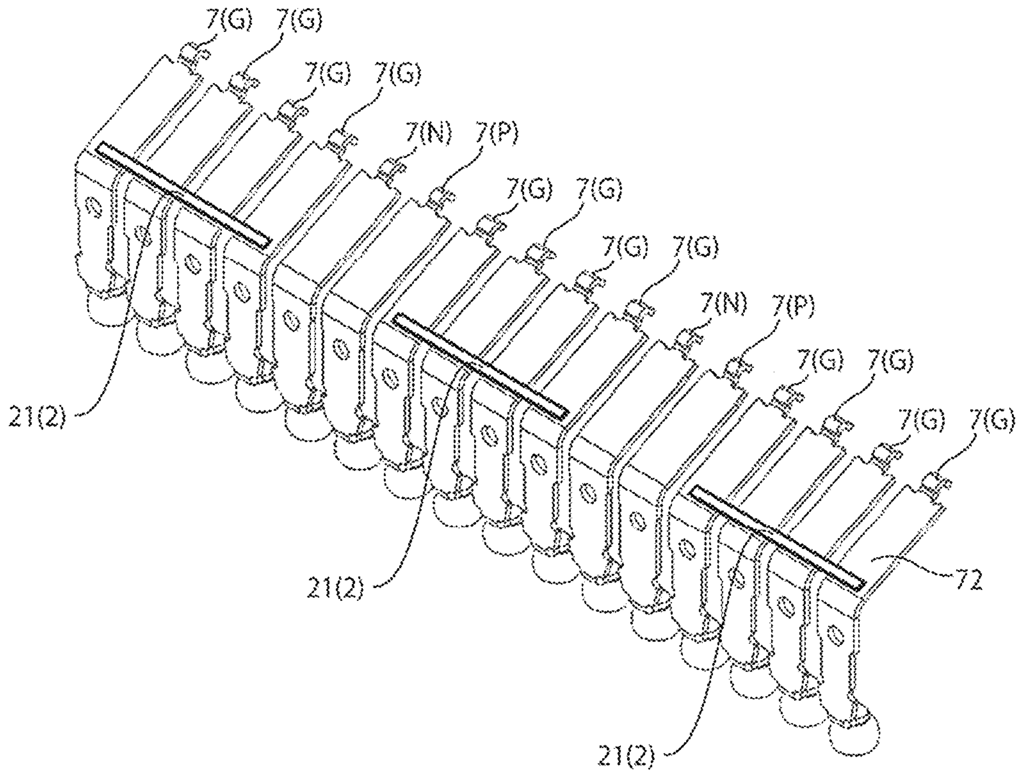
FIG. 12 is a perspective view of contacts and bars of a socket according to a modification example of the present disclosure.
Figure 13:
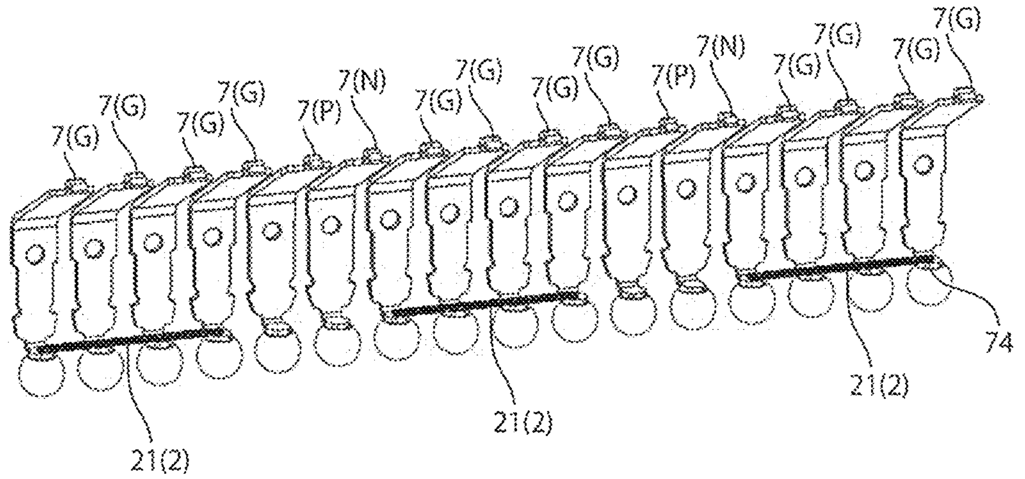
FIG. 13 is a perspective view of contacts and bars of a socket according to another modification example of the present disclosure.

(3) In the second embodiment described above, the bar 21 was fixed to the front surfaces of the insertion portions 73 of four adjacent contacts 7. However, as shown in FIG. 12, the bar 21 may be fixed to the spring portions 72 of the four adjacent contacts 7. In addition, as shown in FIG. 13, the bar 21 may be fixed to the upper surfaces of the soldered portions 74 of four adjacent contacts 7.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A socket, comprising:

a housing which is formed in a box-shape with an opening and provided with a matrix of through holes at a bottom portion; and a plurality of contacts comprising ground contacts and signal contacts which are arranged so as to be aligned alternately in a predetermined array direction by one or a plurality of the contacts and are passed through the through holes, wherein the ground contacts adjacent to each other in the array direction are short-circuited, connecting portions connecting a plurality of ground contacts adjacent to each other in the array direction are provided to the contacts, and wherein the connecting portion is a bar extending in the array direction, and the bar is fixed to the plurality of ground contacts adjacent to each other in the array direction in such a manner that a rear surface of the bar is in contact with corresponding surfaces of the adjacent ground contacts.

2. The socket according to claim 1, wherein each of the ground contacts and signal contacts comprises:

a contact point portion in contact with a substrate of an external communication partner; a spring portion extending from an end portion of the contact point portion;

an insertion portion bent and extending from an end portion of the spring portion and inserted into the through hole; and a soldered portion soldered to be attached to an external substrate at an end portion of the insertion portion, and a width in the array direction of the contact point portion of the ground contact is wider than a width in the array direction of the contact point portions of the signal contacts.

3. The socket according to claim 1, wherein each of the ground contacts and signal contacts comprises:

a contact point portion in contact with a substrate of an external communication partner;

a spring portion extending from an end portion of the contact point portion;

an insertion portion which is bent and extends from an end portion of the spring portion and is inserted into the through hole; and a soldered portion soldered to be attached to an external substrate at an end portion of the insertion portion, and a width in the array direction of the spring portion of the ground contact is narrower than a width in the array direction of the spring portions of the signal contacts.

4. The socket according to claim 1, wherein each of the ground contacts and signal contacts comprises:

a contact point portion in contact with a substrate of an external communication partner;

a spring portion extending from an end portion of the contact point portion;

an insertion portion which is bent and extends from an end portion of the spring portion and is inserted into the through hole; and a soldered portion connected to an end portion of the insertion portion and soldered to be attached to an external substrate, and a width in the array direction of the insertion portion of the ground contact is narrower than a width in the array direction of the insertion portions of the signal contacts.

5. The socket according to claim 1, wherein each of the ground contacts and signal contacts comprises:

a contact point portion in contact with a substrate of an external communication partner;

a spring portion extending from an end portion of the contact point portion;

an insertion portion which is bent and extends from an end portion of the spring portion and is inserted into the through hole; and a soldered portion soldered to be attached to an external substrate at an end portion of the insertion portion, a width in the array direction of the contact point portion of the ground contact is wider than a width in the array direction of the contact point portions of the signal contacts, a width in the array direction of the spring portion of the ground contact is narrower than a width in the array direction of the spring portions of the signal contacts, and width in the array direction of the insertion portion of the ground contact is narrower than a width in the array direction of the insertion portions of the signal contacts.

6. The socket according to claim 1, wherein the connecting portion connects the insertion portions of the plurality of ground contacts adjacent to each other in the array direction.

7. The socket according to claim 1, wherein the bar is bent into an approximate U-shape so as to avoid the signal contacts.

8. The socket according to claim 1, wherein the ground contact comprises a round hole, the bar is made of metal and comprises a plurality of protrusion portions protruding from one surface of the bar, the plurality of protrusion portions of the connecting portion are fitted into the round holes of the plurality of ground contacts adjacent to each other in the array direction.

9. The socket according to claim 1, wherein of the signal contacts, pair of two adjacent signal contacts form one channel of high-speed differential transmission, respective pairs of the signal contacts are arranged apart in the array direction and an orthogonal direction orthogonal to the array direction, and the ground contacts are arranged at adjacent positions in the array direction and adjacent positions in the orthogonal direction in each pair of the signal contacts so as to surround the pair.

10. The socket according to claim 1, further comprising an insulating member extending in one direction, wherein the contacts aligned in the array direction are inserted into the insulating member, and the insulating member is bridged between opposing wall portions of the housing.

* * * * *